United States Patent
Awada et al.

(10) Patent No.: US 12,177,727 B2
(45) Date of Patent: Dec. 24, 2024

(54) UE LOGGING DURING HANDOVER

(71) Applicant: Nokia Solutions and Networks Oy, Espoo (FI)

(72) Inventors: Ahmad Awada, Munich (DE); Guillaume Decarreau, Munich (DE); Ingo Viering, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 379 days.

(21) Appl. No.: 17/597,813

(22) PCT Filed: Jul. 30, 2019

(86) PCT No.: PCT/EP2019/070414
§ 371 (c)(1),
(2) Date: Jan. 25, 2022

(87) PCT Pub. No.: WO2021/018382
PCT Pub. Date: Feb. 4, 2021

(65) Prior Publication Data
US 2022/0256405 A1    Aug. 11, 2022

(51) Int. Cl.
*H04W 36/00* (2009.01)
*H04W 36/08* (2009.01)

(52) U.S. Cl.
CPC ... *H04W 36/0016* (2013.01); *H04W 36/0077* (2013.01); *H04W 36/08* (2013.01)

(58) Field of Classification Search
CPC ......... H04W 36/0016; H04W 36/0077; H04W 36/08; H04W 36/0058; H04W 36/362; H04W 36/0085
See application file for complete search history.

(56) References Cited

U.S. PATENT DOCUMENTS

| 9,467,903 B2 | 10/2016 | Jeong et al. | ................. 455/436 |
| 2015/0024788 A1* | 1/2015 | Jung | ...................... H04W 4/02 |
| | | | 455/456.5 |
| 2018/0014238 A1* | 1/2018 | Lee | ...................... H04W 36/30 |

FOREIGN PATENT DOCUMENTS

| CN | 104982067 A | 10/2015 |
| CN | 108810960 A | 11/2018 |

(Continued)

OTHER PUBLICATIONS

3GPP TSG-RAN WG2 Meeting #106, Reno, NV, USA, May 13-17, 2019, R2-1906482, "Discussions on NR Conditional Handover Procedures", MediaTek Inc., 8 pgs.

(Continued)

*Primary Examiner* — Dady Chery
(74) *Attorney, Agent, or Firm* — McCarter & English LLP

(57) ABSTRACT

A method for use by a communication device, the method including the steps of receiving a handover, HO, command from a serving network cell of a plurality of network cells which provides a communication service for the communication device, acquiring current handover related information, logging the current handover related information only if a predetermined condition is fulfilled, wherein the predetermined condition is a condition that the current handover related information is different from previous handover related information, wherein the previous handover related information was acquired and reported by the communication device before receiving the HO command.

20 Claims, 8 Drawing Sheets

(56) References Cited

FOREIGN PATENT DOCUMENTS

| WO | WO-2018/156696 A1 | 8/2018 |
| WO | WO-2018/228702 A1 | 12/2018 |
| WO | WO 2019/108114 A1 | 6/2019 |

OTHER PUBLICATIONS

3GPP TSG-RAN WG2 Meeting #106, Reno, USA, May 13-17, 2019, R2-1907262, "CFRA resources update for Conditional HO", Nokia, Nokia Shanghai Bell, 3 pgs.

3GPP TS 38.300 V15.6.0 (Jun. 2019), $3^{rd}$ Generation Partnership Project; Technical specification Group Radio Access Network; NR; NR and NG-RAN Overall Description; Stage 2 (Release 15), pp. 48-57.

* cited by examiner

UE LOGGING DURING HANDOVER

CROSS REFERENCE TO RELATED APPLICATION

This patent application is a U.S. National Stage application of International Patent Application Number PCT/EP2019/070414 filed Jul. 30, 2019, which is hereby incorporated by reference in its entirety.

TECHNICAL FIELD

At least some example embodiments relate to mobility in a cellular and mobile communication system such as Long Term Evolution (LTE) or New Radio (NR). In particular, at least some example embodiments relate to so-called "conditional handover" (CHO) which aims at improving mobility robustness, in combination with the usage of multiple beams.

LIST OF ABBREVIATIONS/ACRONYMS

3GPP $3^{rd}$ Generation Partnership Project
BS Base Station
CHO Conditional Handover
gNB Next generation NodeB
HO Handover
LTE Long Term Evolution
NR New Radio
OFDM Orthogonal Frequency Division Multiplexing
RACH Random Access Channel
RRC Radio Resource Control
UE User Equipment
Xn Interface between gNB-to-gNB, as defined in 3GPP TS38.423

BACKGROUND

In case a mobile terminal such as a user equipment (UE) (also referred to in the following as "communication device") is assigned within a (cellular) communication network to one serving node (or "cell"), which is currently serving and/or associated to the mobile terminal, a handover (HO) will be performed to another node (or "cell"), which will subsequently serve the terminal in case of a handover condition. A typical handover condition occurs if a mobile terminal is moving within the cellular communication network across the geographical coverage of a respective node. However, the same geographical coverage can be served by a plurality of nodes or cells, and also in such scenarios, handover conditions may occur. For example, a (single) node may define different cells (e.g. distinguishable by different physical resources associated thereto) and a handover may thus occur at the same node but pertain to a handover from cell to cell. Various handover procedures are known, and among those, one handover procedure is a conditional handover (CHO).

Conditional HO (CHO):

The CHO procedure is similar to a legacy handover. A message sequence chart for a (typical and known) CHO scenario is shown in FIG. 1.

Entities involved in signalling are illustrated in horizontal arrangement as a terminal or user equipment (UE), a source gNB (currently serving/associated to the UE) and a target gNB (subsequently serving/associated to the UE), to which a handover or conditional handover CHO is (to be) performed. Source and target gNBs communicate via an interface Xn (not illustrated as such). Messages exchanged between such entities are illustrated as arrows, and actions/processing of messages at an entity are illustrated as boxes/circles. The time sequence of the messages is from "top-to-down" in the diagram.

The first steps (denoted by S1 to S8 in "Phase 1") are largely identical to the legacy handover. The source gNB performs measurement control (S1) of the UE. A configured event (S2) triggers the UE to send a measurement report (S3) to the serving gNB. Based on this report, the source gNB typically prepares the target gNB for the handover (Handover Request in S4 from the source gNB to the target gNB) and receives (in S5 from the target gNB) a Handover Request Acknowledgement and then sends a handover command to the UE (S6). This command includes a list of the cells or, in general, resources prepared for the handover. The target gNB in a step S7 prepares a corresponding reservation of the resources (cells) acknowledged in S5, and the UE, in a step S8, acknowledges the HO command to the source gNB.

For the legacy HO, the UE will immediately access the target cell/target gNB to complete the handover. Instead, for CHO, the UE will only access the target gNB once an additional CHO execution condition expires. The condition is typically configured, e.g., by the source gNB during HO Command in S6.

The advantage of the CHO is that the HO command (in S6) can be sent very early, in the so-called preparatory phase (phase 1), when the UE is still safe in the source cell, without risking the access in the target cell and the stability of its radio link.

The HO Command is generated by the target cell and included into the "Handover Request Acknowledgement", before the source forwards it to the UE via Radio Resource Control (RRC) signaling.

The "actual" HO is performed in the CHO execution phase (phase 2, see steps S9 to S13). After the CHO execution condition is met, i.e. the CHO execution event occurs, see S9, the UE in a step S10 performs synchronization and random access with/towards the target gNB. Thereafter, a handover complete message is sent in S11 from the UE to the target gNB, and the target gNB acknowledges this in a step S12 in a handover complete acknowledgment message to the source gNB. In a subsequent step/stage S13, the UE and source gNB will adapt to the extent that the "old" i.e. previous preparations or settings are not valid anymore for them. Insofar, after the (HO or) CHO is completed, the target gNB will become the new source gNB.

In CHO, as there could be a significant time-delay between HO preparation and the actual HO execution, the situation at the target cell can potentially change during this time.

Furthermore, as shown in FIG. 1, after receiving the handover command, the UE would not execute the handover immediately to the target cell but rather waits until the CHO execution condition is fulfilled which may take some time. As such, the information that the source cell has about the UE at the preparation time such as e.g. beam/cell measurement, UE position and speed, relevant neighboring cells, last serving beam from source cell, etc., may become outdated at the time instant that the UE executes the handover to target cell.

This uncertainty makes it unclear to record handover statistics. Handover statistics are used today at many places for network optimization, e.g. for tracking area optimization, for interference coordination, for load balancing, for tilt optimization, etc. In CHO, there is still a unique source cell and a unique target cell, but neither the source nor the target cell can record the exact beam boundary, where the handover was finally executed.

For instance, the source does not know the beam of a target cell where the UE eventually executes the handover, and the target does not know the last serving beam in the source cell.

So, neither the source nor the target cell can record the handover statistics on cell and/or beam level, so any network optimization on cell and/or beam level is not possible without improving the recording of the handover statistics.

The problem is further illustrated in FIG. 2. Black dots indicate base stations, different colors (gray, dark gray and light gray) indicate the dominance area of different cells, and the different shadings indicate the dominance area of different beams. A UE is moving from the source cell (dark gray) to the target cell (light gray), performing a CHO. The source cell may prepare and configure the CHO to the target cell at an early stage, when e.g. the UE is in beam 1 and has reported to the source cell that beam 8 of the target cell is the strongest. However, the CHO is only executed when the CHO execution condition expires, and at this point in time, the UE has proceeded to beam 3 of source cell, and beam 5 of the target cell might be the strongest and therefore selected for a Random Access Channel (RACH) access and CHO completion.

Still, it is unique that the handover has happened between the source and the target cell. However, it is not clear between which beams, in detail:

The source cell does not know in which beam the UE has shown up (which would be beam 5 in this example). It knows that beam 3 was the last serving beam. It also knows that it has prepared beam 8 when the UE was in beam 1.

The target cell definitely does not know the last serving beam of the source cell (which would be beam 3 in this example). It may not even know the serving beam during preparation (beam 1). It knows the prepared beam (beam 8) and the actually accessed beam (beam 5).

The "true" handover boundary is the pair source cell beam 3/target cell beam 5, which is neither known by the source cell nor by the target cell.

The "prepared" handover boundary between source cell beam 1/target cell beam 8 is known to the source. However, this information might be misleading.

For the sake of completeness it is noted that the pair source cell beam 1/target cell beam 5 would confuse any network optimization, so purely updating the HO statistics with the truly accessed beam (which could be done by the target cell) is not an option.

It has been disclosed for NR conventional handover of Rel. 15 that a UE may log the beam measurements of serving and neighboring cells at the time instant when the UE performs RACH access to a target cell. This can help the source cell to identify whether the available information about the UE has changed since the transmission of the handover command.

Nevertheless, as the time duration between the handover preparation and execution is short in conventional handover, the information logged by the UE at the handover execution may be in many cases the same as that reported before the reception of the handover command. As such, the UE logging and reporting would be vain in these cases.

In conditional handover, the elapsed time duration T between the reception of the handover command and execution may vary for each target cell depending on the radio conditions, speed of the UE, etc.

Applying the prior-art logging approach to conditional handover may lead as well to unnecessary logging and reporting of information if the elapsed time duration T is small or radio conditions did not change much at the CHO execution time instant.

SUMMARY

It is an object of at least some of example embodiments to improve the prior art.

This object is achieved by the methods, apparatuses and non-transitory storage media as specified in the appended claims.

Further, computer program products, comprising computer executable code, which, when executed by a processor, perform the method according to any of the method aspects are provided.

At least some exemplary embodiments are provided for reducing unnecessary UE logging and reporting to the network in conventional and conditional handover scenarios.

According to at least some example embodiments, at least one of the following advantages is achieved:
The UE does not have to log unnecessary information which consumes radio resources for reporting.
No waste of processing energy, as the UE does not have to log unnecessary information.
Ultimately, this supports and improves the user quality of experience because of improved service continuity.

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the appended drawings, wherein.

DETAILED DESCRIPTION OF CERTAIN EXAMPLE EMBODIMENTS

Herein below, certain aspects are exemplified by at least some embodiments which are described in detail with reference to the accompanying drawings. Features of the example embodiments can be freely combined with each other unless otherwise described. However, it is to be expressly understood that the description of certain example embodiments/aspects is given by way of example only, and that it is not intended to be understood as limiting the application to the details disclosed.

It is to be understood that any of the modifications mentioned can be applied singly or in combination to the respective aspects to which they refer, unless they are explicitly stated as excluding alternatives.

Moreover, it is to be understood that the apparatus is configured to perform the corresponding method, although in some cases only the apparatus or only the method is described.

According to at least some example embodiments, a communication device (also referred to as "user equipment (UE)") receives a handover (HO) command from a serving network cell of a plurality of network cells. When the communication device receives the HO command it starts acquiring current handover related information. If a predetermined condition is fulfilled, the communication device logs the current handover related information.

Figure 3:
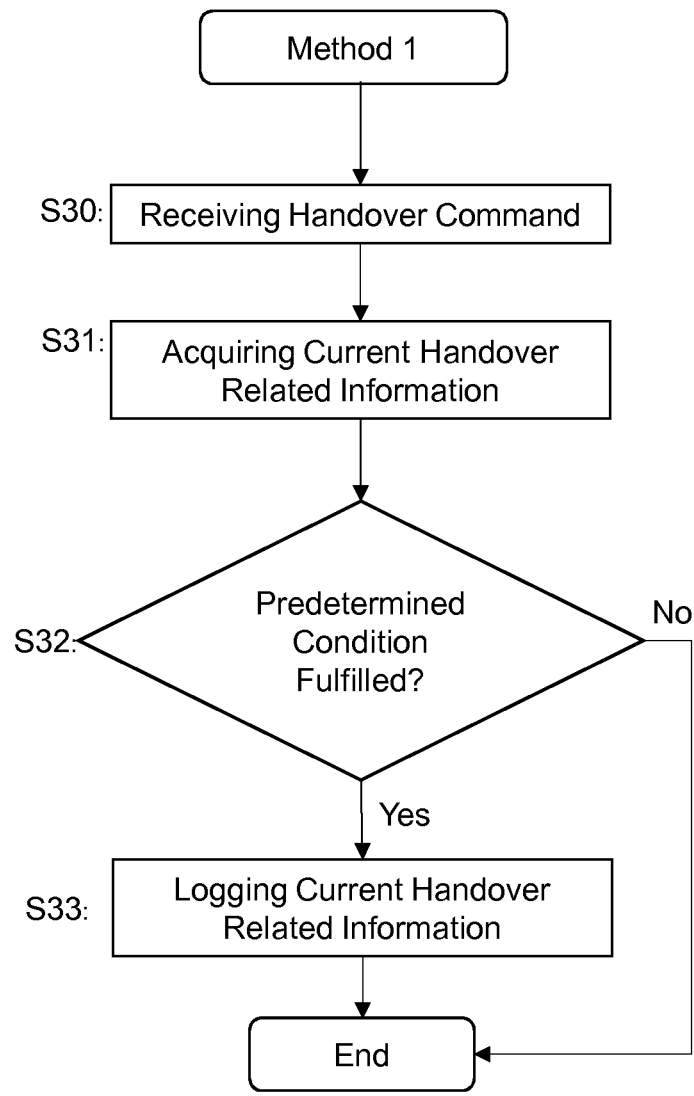
FIG. 3 shows a flowchart illustrating an example method according to at least some embodiments.

In FIG. 3, a method 1 according to at least some example embodiments is illustrated.

In S30 of method 1, a communication device receives an HO command from a serving network cell of a plurality of cells of a communication network. The serving cell provides a communication service for the communication device. Subsequently, in S31, the communication device acquires current handover related information. In S32 it is checked whether or not a predetermined condition is fulfilled. If "Yes" in S32, the current handover related information is logged in S33. Otherwise (if "No" in S32), the method ends without logging the current handover related information. It is to be noted that the current handover related information refers to specific information (also referred to as information Y below) that is logged and reported only if the predetermined condition is fulfilled.

In at least some example embodiments, the source cell instructs the UE to log and report new HO related information (e.g. information about beam and/or cell measurement by the UE, UE position and speed, relevant neighboring cells, last serving beam from source cell, etc.) at the time instant when the HO is executed under at least one of the following conditions:

(1) If the measurements have a configurable difference to the last reported measurements before the reception of the HO command, i.e. radio conditions and measurements have changed significantly.

(2) If at least one beam and/or cell measurement of the target cell or other neighboring cell (including the previous serving cell) is different from what has been previously reported by at least a certain threshold, e.g., by +/−Q1 dB difference.

(3) If the UE detects at least one new beam and/or cell measurement for a neighboring cell (including the serving cell) which was not reported before, e.g., a beam measurement above a threshold value T1 or a neighbor cell measurement is Q2 dB stronger than source cell.

(4) If the serving beam has changed since the reception of the HO command message.

(5) If at least a certain time duration T has elapsed since the reception of the HO command. It is noted that this condition is more relevant for CHO.

According to at least some example embodiments, the predetermined condition checked in S32 is a condition that the current handover related information is different from previous handover related information, wherein the previous handover related information was acquired and reported by the communication device before receiving the HO command. In other words, the predetermined condition comprises at least one of conditions (1) to (4) as indicated above.

Alternatively or in addition, the predetermined condition checked in S32 is a condition that at least one certain time duration T has elapsed since the receiving of the handover command before initiating a conditional handover, CHO, execution. In other words, the predetermined condition comprises condition (5) as indicated above.

In at least some example embodiments, an HO execution is initiated after the handover command was received, or after the handover command was received and if a predefined handover condition for the HO execution is fulfilled.

In at least some example embodiments, for conventional HO and CHO, the time instant for handover execution is defined by the time instant for sending a RACH preamble (message 1).

In at least some example embodiments, for CHO, the time instant for handover execution is defined as the time instant when the CHO condition is fulfilled.

Moreover, in at least some example embodiments, at least one certain time duration is derived from at least one of system information parameters and/or information related to the handover command.

Furthermore, according to at least some example embodiment, the at least one certain time duration is scaled by a mobility state of the communication device.

In addition, in at least some example embodiments, the at least one certain time duration is given in at least one of seconds, milliseconds, number of elapsed radio frames, sub-frames, slot and/or Orthogonal Frequency Division Multiplexing, OFDM, symbols.

Furthermore, in at least some example embodiments, an indication about the availability of logged current handover related information is transmitted to a target network cell of the plurality of the network cells (also referred to as 'the other one of the plurality of network cells' in the following), which provides the communication service, after a random access channel (RACH) access between the communication device and the target network cell was performed.

In addition, in at least some example embodiments, a request to report the logged current handover related information is received from the target network cell, upon transmitting the indication about availability of logged current handover related information to the target network cell.

Furthermore, in at least some example embodiments, the logged current handover related information is transmitted to the target network cell, after the UE received the request to report the logged current handover related information from the target network cell.

Moreover, in at least some example embodiments, the transmission of the logged current handover related information is performed directly after or during completion of a handover execution.

Figure 4:
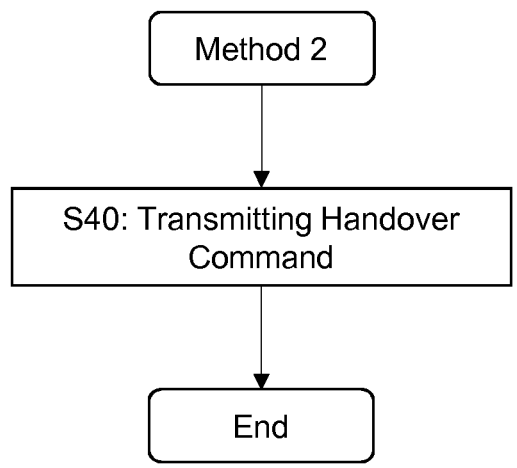
FIG. 4 shows a flowchart illustrating an example method according to at least some embodiments.

In FIG. 4, a method 2 according to at least some example embodiments is illustrated. In S40, a serving network cell of a plurality of network cells, which serves a UE (hereinafter also referred to as 'communication device') transmits an HO command to the UE for handing over the UE to a target network cell (hereinafter also referred to as 'another one of the plurality of network cells') (S40). The HO command comprises a predetermined condition for when current handover related information is to be logged. Then the method ends.

In at least some example embodiments, the predetermined condition is the same as described above with respect to the method 1.

Figure 1:
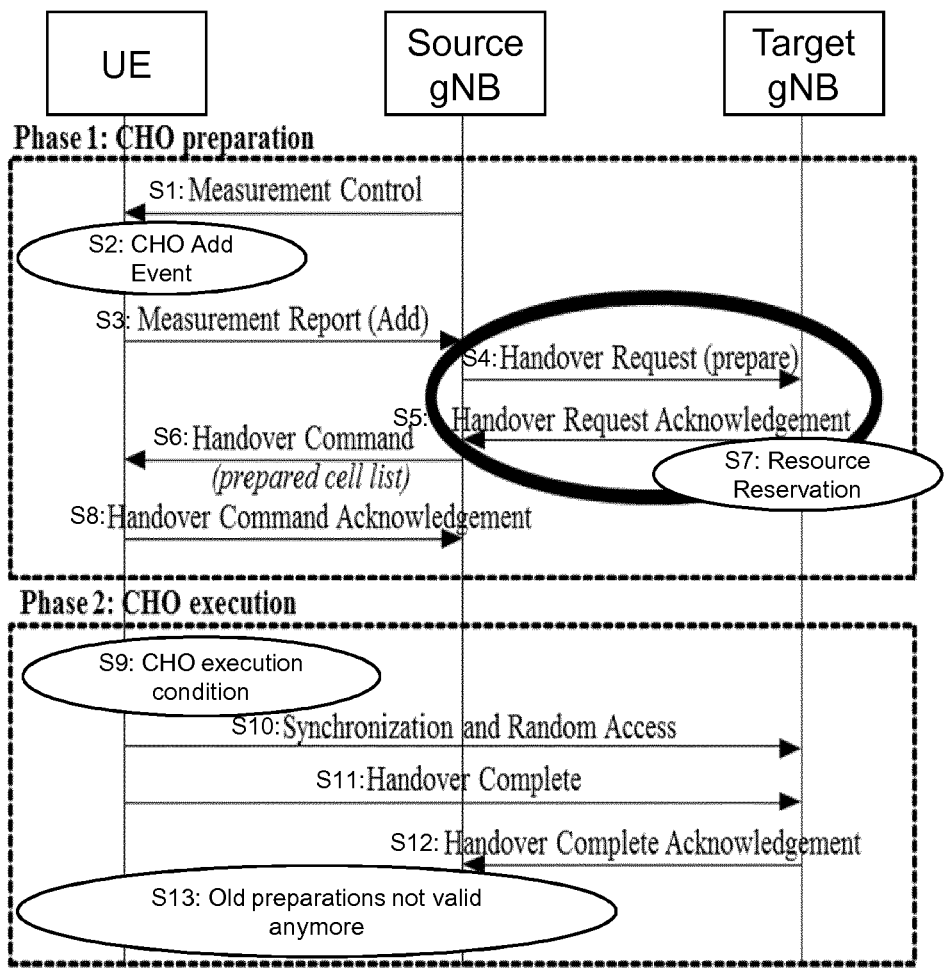
FIG. 1 shows a signaling diagram illustrating a CHO preparation and execution procedure.
Figure 2:
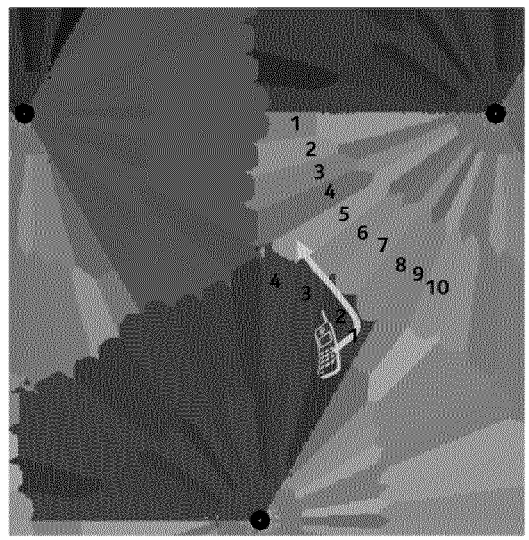
FIG. 2 shows an example for uncertainty in the current beam usage for handover statistics during CHO caused by the mobility of the UE.
Figure 5:
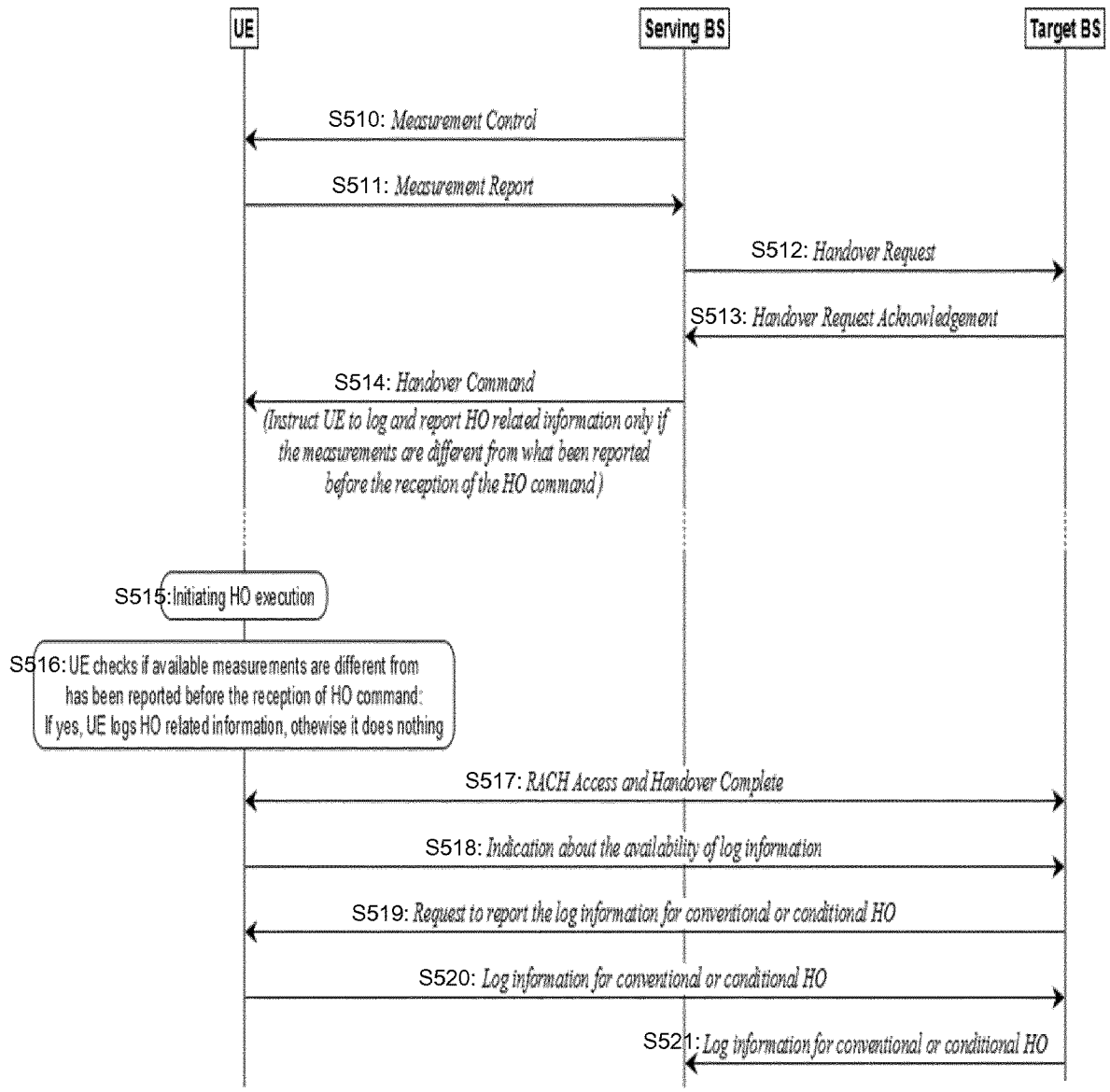
FIG. 5 shows a signaling diagram illustrating an HO preparation procedure and an example of acquiring, logging and exchanging HO related information according to at least some example embodiments.

FIG. 5 shows a signaling diagram illustrating an HO preparation procedure and an example of acquiring, logging and exchanging HO related information according to at least some example embodiments. As for FIG. 1 entities involved in signaling are illustrated in horizontal arrangement as a user equipment (UE), a serving BS (e.g. source gNB, BS currently serving/associated to the UE) and a target BS (e.g. target gNB, BS subsequently serving/associated to the UE), to which a handover or conditional HO is (to be) performed. Serving and target BSs communicate via an interface Xn (not illustrated as such). Messages exchanged between such entities are illustrated as arrows and actions/processing of messages at an entity are illustrated as boxes/circles. The time sequence of the messages is from "top-to-bottom" in the diagram.

In the beginning of the relevant procedure, the serving BS (source cell) sends a measurement control message (S510) to the UE. The UE then sends a measurement report (S511) to the source cell, which triggers an HO request (S512) from the source cell to the target BS (target cell). This request is acknowledged by an HO request acknowledgement (S513) from the target cell to the source cell. After this, the source cell issues an HO command (S514) to the UE. This HO command includes information instructing the UE to log and report current HO related information only if a predetermined condition is fulfilled. In the example implementation shown in FIG. 5, the predetermined condition is fulfilled in case the measurements are different from what has been reported before the reception of the HO command (e.g. in case the current HO related information is different from previous HO related information reported before the reception of the HO command). After receiving the HO command, the UE initiates an HO execution (S515). Then, the UE logs the current HO related information if they are different from those, which have been reported before the reception of the HO command (S516). Otherwise, it does nothing. Next, a RACH access takes place and the HO is completed (S517). In a subsequent step, the UE transmits an indication about the availability of logged current HO related information to the target cell (S518). The target cell signals its interest in the information by requesting to report the current logged HO related information (S519) and the UE sends it accordingly (S520). Eventually, the target cell forwards the current logged HO related information to the source cell for further use (S521).

It can be understood that the steps of FIGS. 3 and 4 are also reflected in the example procedure of FIG. 5. Receiving/transmitting an HO command in step S30/S40 corresponds to step S514, in which the source cell issues an HO command to the UE. In steps S31, S32 and S33 current HO related information is acquired and logged, if a predetermined condition is fulfilled, which is also performed in the example embodiment of FIG. 5 in steps S515 and S516.

Figure 6:
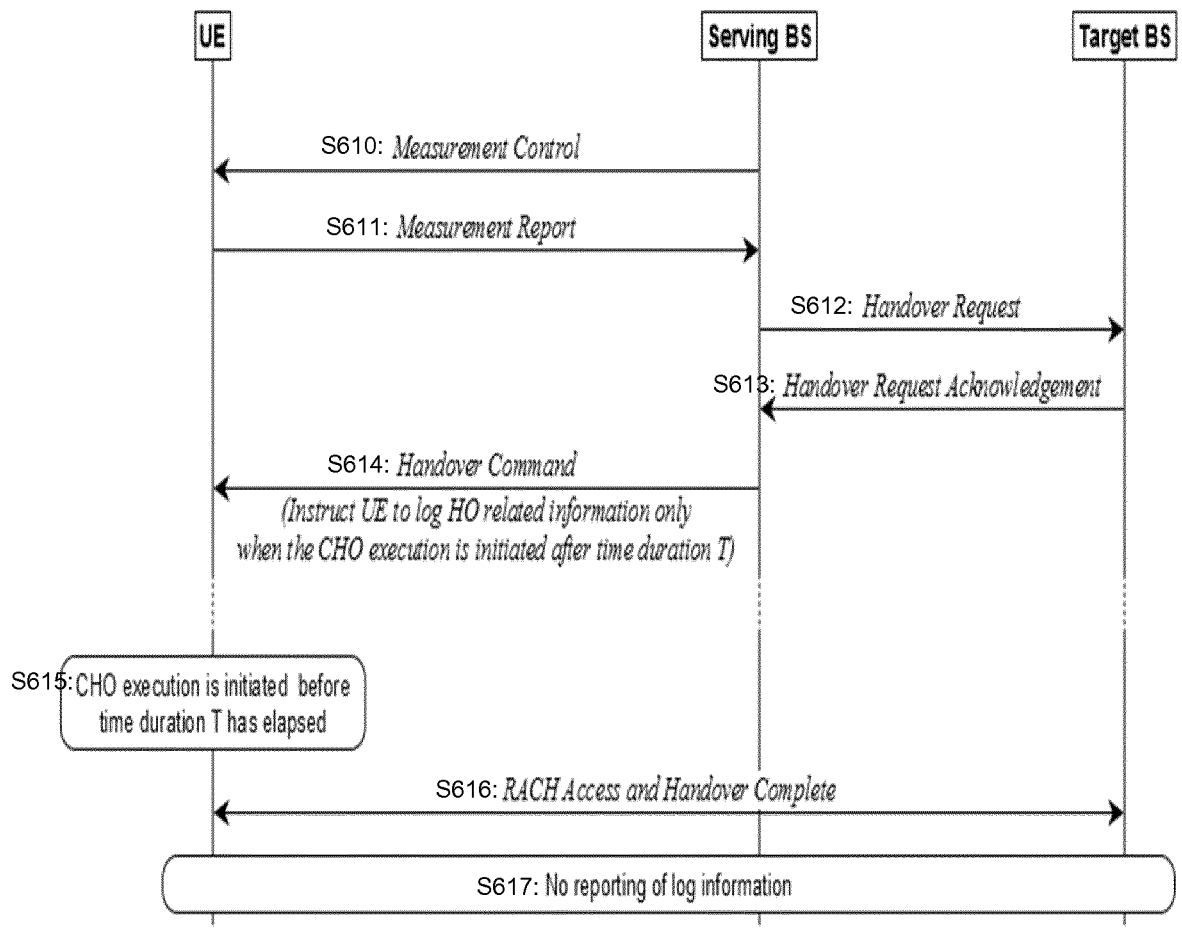
FIG. 6 shows a signaling diagram according to at least some example embodiments, when a CHO execution is initiated before a certain time duration T has elapsed since the reception of the HO.
Figure 7:
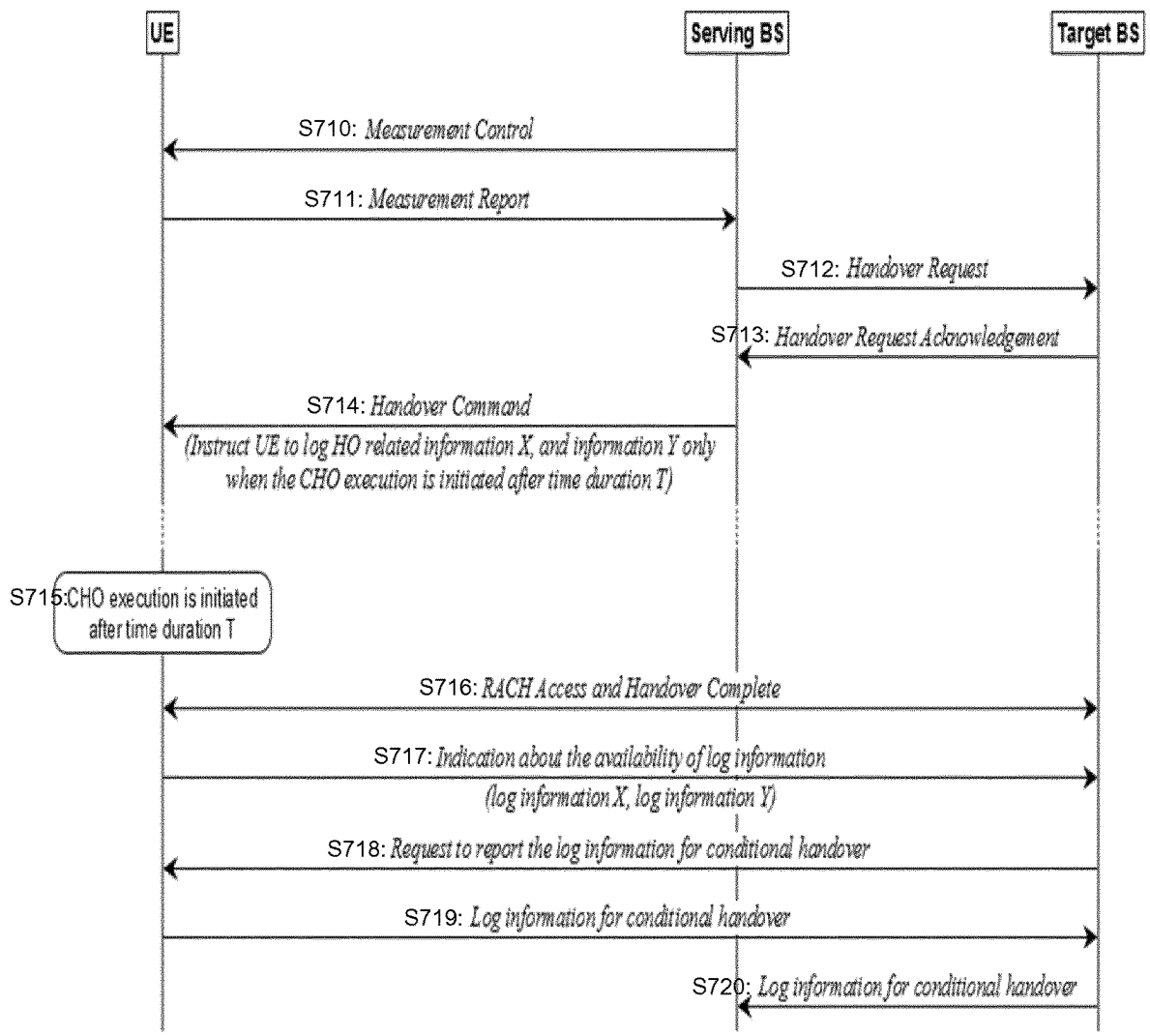
FIG. 7 shows a signaling diagram according to at least some example embodiments when a UE initiates a CHO execution after a certain time duration T has elapsed since the reception of the HO.

FIGS. 6 and 7 show signaling diagrams illustrating procedures according to at least some example implementations in which the predetermined condition is a condition that at least one certain time duration T has elapsed since the reception of the handover command before initiating a CHO execution. FIG. 6 illustrates the case when a CHO execution is initiated before the certain time duration T has elapsed since the reception of the HO. As for FIGS. 1 and 5, entities involved in signaling are illustrated in horizontal arrangement as a user equipment (UE), a serving BS (e.g. source gNB, BS currently serving/associated to the UE) and a target BS (e.g. target gNB, BS subsequently serving/associated to the UE), to which a handover or conditional HO is (to be) performed. Serving and target BSs communicate via an interface Xn (not illustrated as such). Messages exchanged between such entities are illustrated as arrows and actions/processing of messages at an entity are illustrated as boxes/circles. The time sequence of the messages is from "top-to-bottom" in the diagram.

In the beginning of the relevant procedure, the serving BS (source cell) sends a measurement control message (S610) to the UE. The UE then sends a measurement report (S611) to the source cell, which triggers an HO request (S612) from the source cell to the target BS (target cell). This request is acknowledged by an HO request acknowledgement (S613) from the target cell to the source cell. After this, the source cell issues an HO command (S614) to the UE. This HO command includes information instructing the UE to log and report HO current HO related information only if the CHO execution is initiated after the certain time duration T. In step S615 the CHO execution is initiated before the certain time duration T has elapsed. Next, an RACH access takes place and the HO is completed (S616). However, since the CHO execution was initiated before the certain time duration has elapsed, no current HO related information is logged and reported (S617).

It can be understood that the steps of FIGS. 3 and 4 are also reflected in the example procedure of FIG. 6. Receiving/transmitting an HO command in step S30/S40 corresponds to step S614, in which the source cell issues an HO command to the UE. In steps S31, S32 and S33 current HO related information is acquired and logged, if a predetermined condition is fulfilled. However, in the example embodiment of FIG. 6 the predetermined condition is not fulfilled and consequently, no current HO related information is reported to the target network cell (S617).

FIG. 7 shows the case when the UE initiates the CHO execution after the certain time duration T has elapsed since the reception of the HO. Steps S710 to S714 of FIG. 7 correspond to steps S610 to S614 of FIG. 6 and a description of these steps is therefore omitted.

In step S715, the CHO execution is initiated after the certain time duration T has elapsed, and the UE logs the current HO related information. Next, a RACH access takes place and the HO is completed (S716). In a subsequent step, the UE transmits an indication about the availability of logged current information to the target cell (S717). According to an example implementation, this information includes both handover related information X, which is needed by the network and reported by the UE irrespective of the predetermined condition (here the elapsed time duration T), and handover related information Y, which is reported only if the predetermined condition is fulfilled (here if the elapsed time duration (from the reception of the HO command) exceeds the time duration T). In this example implementation, the handover related information Y is the "current handover related information" logged in S33 of FIG. 3. The target cell signals its interest in the information by requesting to report the current logged HO related information (S718) and the UE sends it accordingly (S719). Eventually, the target cell forwards the current logged HO related information to the source cell for further use (S720).

It can be understood that the steps of FIGS. 3 and 4 are also reflected in the example procedure of FIG. 7. Receiving/transmitting an HO command in step S30/S40 corresponds to step S714, in which the source cell issues an HO command to the UE. In steps S31, S32 and S33 current handover related information is acquired and logged, if a predetermined condition is fulfilled. These steps are also reflected in step S715 of FIG. 7.

Figure 8:
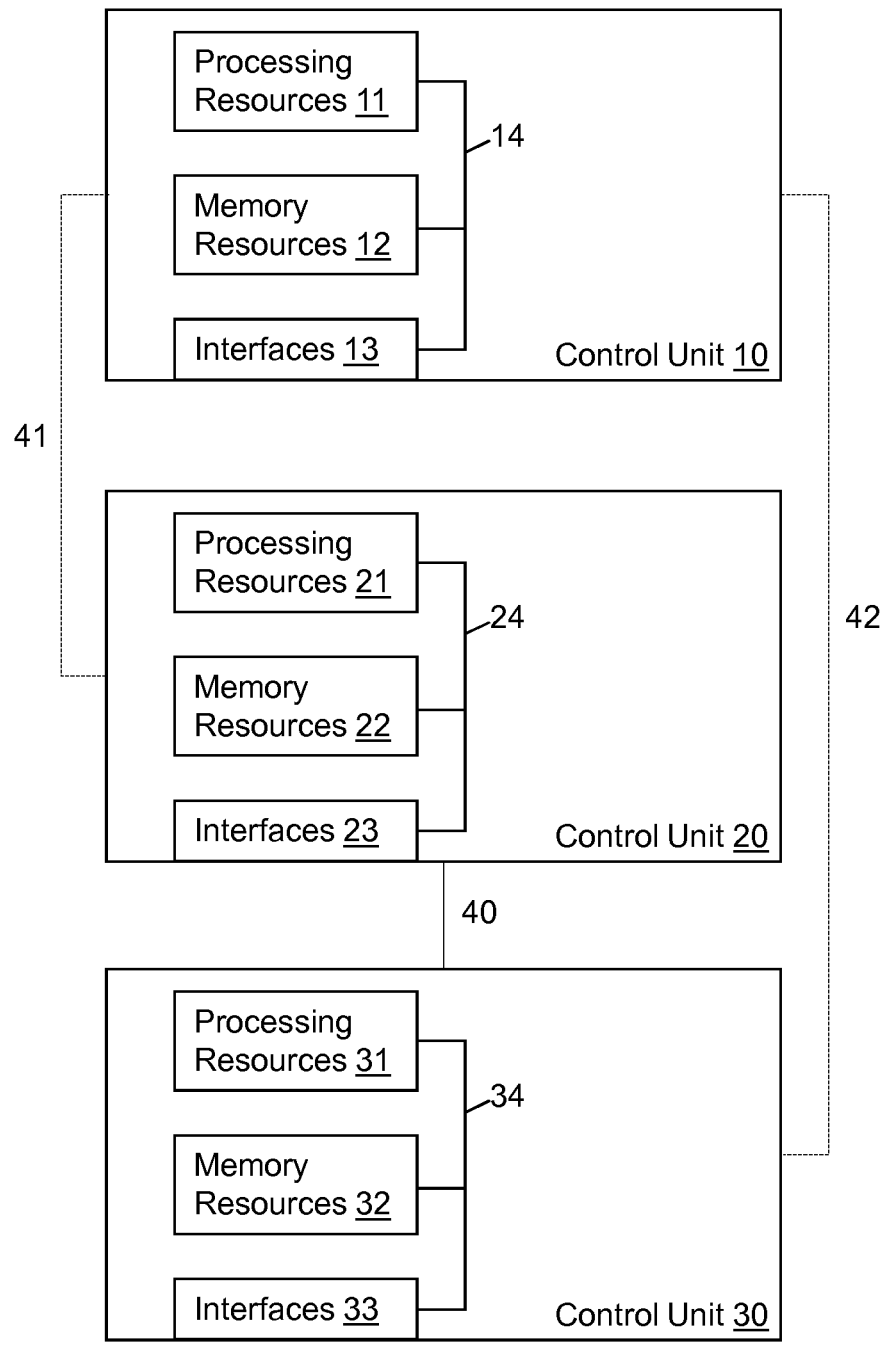
FIG. 8 shows a schematic block diagram illustrating a configuration of control units in which at least some example embodiments are implementable.

FIG. 8 depicts control units 10, 20, and 30, each comprising processing resources (e.g. processing circuitry) 11, 21, 31, memory resources (e.g., memory circuitry) 12, 22, 32 and interfaces (e.g., interface circuitry) 13, 23, 33. In at least one exemplary embodiment, the control unit 10 is configured to be implemented in and/or used by a UE, e.g. the communication device as described above and/or the UE shown in FIGS. 5, 6 and 7, the control unit 20 is configured to be implemented in and/or used by a serving BS, e.g. source cell and/or serving BS shown in FIGS. 5, 6 and 7, and the control unit 30 is configured to be implemented in and/or used by a target BS, e.g. target cell and/or target BS shown in FIGS. 5, 6 and 7. Further, each control unit has an own bus system 14, 24, 34 which connects the aforementioned resources such that data can be exchanged between the three components of a unit. In addition, control units 10 and 20, as well as control units 10 and 30 can be connected wirelessly via links 41, 42. Control unit 20 and control unit 30 further have an additional Xn interface 40, which enables a connection between the respective units and their resources.

The terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments provide, for example, a base station such as a gNB, or a component thereof, an apparatus embodying the same, a method for controlling and/or operating the same, and computer program(s) controlling and/or operating the same as well as mediums carrying such computer program(s) and forming computer program product(s).

In general, the various embodiments of the UE can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:
  (a) hardware-only circuit implementations (such as implementations in only analog and/or digital circuitry) and
  (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
  (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus for use by a communication device is provided. For example, the apparatus comprises the control unit 10 shown in FIG. 8. According to another example implementation or in addition, the apparatus is configured to execute the method 1 illustrated in FIG. 3.

The apparatus comprises means for receiving a handover, HO, command from a serving network cell of a plurality of network cells which provides a communication service for the communication device, means for acquiring current handover related information, and means for logging the current handover related information only if a predetermined condition is fulfilled.

According to at least some example implementations, the predetermined condition is a condition that the current handover related information is different from previous handover related information, wherein the previous handover related information was acquired and reported by the communication device before receiving the HO command.

According to at least some example implementations, alternatively or in addition, the predetermined condition is a condition that a certain time duration T has elapsed since the receiving of the handover command before initiating a conditional handover, CHO, execution.

According to an example implementation, the apparatus further comprises means for obtaining, from at least one of system information parameters and/or information related to the handover command, an instruction to log the current handover related information only if the predetermined condition is fulfilled, and/or obtaining the predetermined condition.

According to an example implementation, the handover related information comprises at least one of beam information about a beam radiated by the serving network cell and serving the communication device, and/or about a beam radiated by another one of the plurality of network cells, cell information acquired by the communication device from the serving network cell, and/or the other one of the plurality of network cells, and position and/or speed of the communication device.

According to an example implementation, the predetermined condition is fulfilled in case that the current handover related information is different from the previous handover related information by at least one certain threshold value.

According to an example implementation, the predetermined condition is fulfilled in case that the current handover related information comprises an item, which was not included in the previous handover related information.

According to an example implementation, the predetermined condition is fulfilled in case that at least one of a beam of the serving network cell and a beam of a neighboring network cell has changed since reception of the HO command.

According to an example implementation, the apparatus further comprises means for initiating an HO execution after receiving the handover command, or means for initiating an HO execution after receiving the handover command and if a predefined handover condition for the HO execution is fulfilled.

According to an example implementation, the apparatus further comprises means for, having initiated the HO execution, transmitting an indication about availability of the logged current handover related information to the other one of the plurality of network cells, which provides the communication service, after performing a random access channel, RACH, access between the communication device and the other one of the plurality of network cells.

According to an example implementation, the apparatus further comprises means for receiving a request to report the logged current handover related information from the other one of the plurality of network cells, which provides the communication service, upon transmitting the indication about availability of logged current handover related information to the other one of the plurality of network cells, which provides the communication service.

According to an example implementation, the apparatus further comprises means for transmitting the logged current handover related information to the other one of the plurality of network cells upon receiving the request to report the logged current handover related information from the other one of the plurality of network cells.

According to an example implementation, the transmission of the logged current handover related information is performed directly after or during completion of a handover execution.

According to an example implementation, a time instant for the CHO execution is defined by the time instant for sending a random access channel, RACH, preamble.

According to an example implementation, a time instant for handover execution is defined by the time instant when a CHO condition is fulfilled.

According to an example implementation, the certain time duration T is scaled by a mobility state of the communication device.

According to an example implementation, the certain time duration T is given in at least one of seconds, milliseconds, number of elapsed radio frames, sub-frames, slot and/or Orthogonal Frequency Division Multiplexing, OFDM, symbols.

According to at least some example embodiments, an apparatus for use by a serving network cell of a plurality of network cells which provides a communication service for a communication device is provided. For example, the apparatus comprises the control unit 20 shown in FIG. 8. According to another example implementation or in addition, the apparatus is configured to execute the method 2 illustrated in FIG. 4.

The apparatus comprises means for transmitting a handover, HO, command to the communication device for handing over the communication device to another one of the plurality of network cells, wherein the handover command comprises a predetermined condition for when current handover related information is to be logged.

According to at least some example implementation, the predetermined condition is a condition that the current handover related information is different from previous handover related information, wherein the previous handover related information was acquired and reported by the communication device before receiving the HO command.

According to at least some example implementations, alternatively or in addition, the predetermined condition is a condition that a certain time duration T has elapsed since the receiving of the handover command before initiating a conditional handover, CHO, execution.

According to an example implementation, the handover related information comprises at least one of beam information about a beam radiated by the serving network cell and serving the communication device, and/or about a beam radiated by another one of the plurality of network cells, cell information acquired by the communication deice from the serving network cells, and/or the other one of the plurality of network cells, and position and/or speed of the communication device.

According to an example implementation, the predetermined condition is fulfilled in case that the current handover related information is different from the previous handover related information by at least one certain threshold value.

According to an example implementation, the predetermined condition is fulfilled in case that the handover related information comprises an item, which was not included in the previous handover related information.

According to an example implementation, the predetermined condition is fulfilled in case that at least one of a beam of the serving network cell and a beam of a neighboring network cell has changed since reception of the HO command.

According to an example implementation, the apparatus further comprises means for receiving the logged current handover related information from the other one of the plurality of network cells via an Xn interface, which received the logged current handover related information from the communication device, wherein the other one of the plurality of network cells is a target cell.

In an example implementation, the certain time duration T is scaled by a mobility state of the communication device.

In an example implementation the certain time duration T is given in at least one of seconds, milliseconds, number of elapsed radio frames, sub-frames, slot and/or Orthogonal Frequency Division Multiplexing, OFDM, symbols.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. A method comprising:
   receiving, by a user equipment, a handover command from a serving network cell of a plurality of network cells of a communication network which provides a communication service for the user equipment,
   acquiring, by the user equipment, current handover related information,
   logging, by the user equipment, the current handover related information when a predetermined condition is fulfilled,
      wherein the predetermined condition is a condition that the current handover related information is different from previous handover related information,
      wherein the previous handover related information was acquired and reported with the user equipment before receiving the handover command; and
   based on fulfilling the predetermined condition, initiating a conditional handover execution,
   wherein the predetermined condition further comprises a condition that before initiating the conditional handover execution a certain time duration has elapsed since the receiving of the handover command.

2. The method according to claim 1, further comprising:
   obtaining, from at least one of system information parameters, information related to the handover command, and an instruction to at least one of log the current handover related information only if the predetermined condition is fulfilled or the predetermined condition is obtained.

3. The method according to claim 1, wherein the handover related information comprises at least one of:
   beam information about at least one of a beam radiated by the serving network cell and serving the user equipment, or about a beam radiated by another one of the plurality of network cells,
   cell information acquired with the user equipment from the serving network cell, and/or the other one of the plurality of network cells, or
   at least one of a position or a speed of the user equipment.

4. The method according to claim 3, wherein the predetermined condition is fulfilled in case that at least one of a beam of the serving network cell and a beam of a neighboring network cell has changed since reception of the handover command.

5. The method according to claim 1, wherein the predetermined condition is fulfilled in case that the current handover related information is different from the previous handover related information by at least one certain threshold value.

6. The method according to claim 1, wherein the predetermined condition is fulfilled in case that the current handover related information comprises an item, which was not included in the previous handover related information.

7. The method according to claim 1, further comprising:
   initiating an handover execution after receiving the handover command, or
   initiating an handover execution after receiving the handover command and if a predefined handover condition for the handover execution is fulfilled.

8. The method according to claim 7, further comprising:
   having initiated the handover execution, transmitting an indication about availability of the logged current handover related information to the other one of the plurality of network cells, which provides the communication service, after performing a random access channel access between the user equipment and the other one of the plurality of network cells.

9. The method according to claim 8, further comprising:
   receiving a request to report the logged current handover related information from the other one of the plurality of network cells, which provides the communication service, upon transmitting the indication about availability of logged current handover related information to the other one of the plurality of network cells, which provides the communication service.

10. The method according to claim 9, further comprising:
    transmitting the logged current handover related information to the other one of the plurality of network cells upon receiving the request to report the logged current handover related information from the other one of the plurality of network cells.

11. The method according to claim 1, wherein the transmission of the logged current handover related information is performed directly after or during completion of a handover execution.

12. A method comprising:
    transmitting, by a serving network cell of a plurality of network cells of a communication network which provides a communication service for a user equipment, a handover command to the user equipment for handing over the user equipment to another one of the plurality of network cells,
    wherein the handover command comprises a predetermined condition for when current handover related information is to be logged,
       wherein the predetermined condition is a condition that the current handover related information is different from previous handover related information, wherein the previous handover related information was acquired and reported with the user equipment before receiving the handover command, wherein based on the predetermined condition being fulfilled for initiating a conditional handover execution,
    wherein the predetermined condition further comprises a condition that before initiating the conditional handover execution a certain time duration has elapsed since the receiving of the handover command.

13. The method according to claim 12, wherein the predetermined condition further comprises a condition that a certain time duration has elapsed since the receiving of the handover command before initiating a conditional handover execution.

14. The method according to claim 12, wherein the handover related information comprises at least one of:
beam information about at least one of a beam radiated by the serving network cell and serving the user equipment, or about a beam radiated by another one of the plurality of network cells,
cell information acquired with the communication deice from at least one of the serving network cells, the other one of the plurality of network cells, or position or speed of the user equipment.

15. The method according to claim 14, wherein the predetermined condition is fulfilled in case that at least one of a beam of the serving network cell and a beam of a neighboring network cell has changed since reception of the handover command.

16. The method according to claim 12, wherein the predetermined condition is fulfilled in case that the current handover related information is different from the previous handover related information by at least one certain threshold value.

17. The method according to claim 12, wherein the predetermined condition is fulfilled in case that the handover related information comprises an item, which was not included in the previous handover related information.

18. The method according to claim 12, further comprising:
receiving the logged current handover related information from the other one of the plurality of network cells via an Xn interface, which received the logged current handover related information from the user equipment, wherein the other one of the plurality of network cells is a target cell.

19. An apparatus comprising:
at least one processor; and
at least one memory,
wherein the at least one memory is storing instructions that when executed by the at least one processor, cause the apparatus at least to perform:
receiving a handover command from a serving network cell of a plurality of network cells which provides a communication service for the communication device,
acquiring current handover related information,
logging the current handover related information dependent upon a predetermined condition being fulfilled,
wherein the predetermined condition is a condition that the current handover related information is different from previous handover related information, wherein the previous handover related information was acquired and reported with the communication device before receiving the handover command, and
wherein the predetermined condition further comprises a condition that a certain time duration has elapsed since the receiving of the handover command before initiating a conditional handover execution.

20. An apparatus for use with a serving network cell of a plurality of network cells of a communication network which provides a communication service for a communication device, the apparatus comprising:
at least one processor; and
at least one memory,
wherein the at least one memory is storing instructions that when executed by the at least one processor, cause the apparatus at least to perform:
transmitting a handover command to the communication device for handing over the communication device to another one of the plurality of network cells,
wherein the handover command comprises a predetermined condition for when current handover related information is to be logged,
wherein the predetermined condition is a condition that the current handover related information is different from previous handover related information,
wherein the predetermined condition further comprises a condition that before initiating the conditional handover execution a certain time duration has elapsed since the receiving of the handover command, and
wherein the previous handover related information was acquired and reported by the communication device before receiving the handover command.

* * * * *